United States Patent
Hagenbuch

(10) Patent No.: US 11,673,615 B2
(45) Date of Patent: Jun. 13, 2023

(54) AUTOMATIC FLUIDIC SEALING TAILGATE

(71) Applicant: LeRoy George Hagenbuch, Peoria Heights, IL (US)

(72) Inventor: LeRoy George Hagenbuch, Peoria Heights, IL (US)

( * ) Notice: Subject to any disclaimer, the term of this patent is extended or adjusted under 35 U.S.C. 154(b) by 139 days.

(21) Appl. No.: 17/125,398

(22) Filed: Dec. 17, 2020

(65) Prior Publication Data
US 2021/0188369 A1 Jun. 24, 2021

Related U.S. Application Data

(60) Provisional application No. 62/949,924, filed on Dec. 18, 2019.

(51) Int. Cl.
*B62D 33/027* (2006.01)
*B60P 1/26* (2006.01)
*B60P 1/28* (2006.01)

(52) U.S. Cl.
CPC ............ *B62D 33/0273* (2013.01); *B60P 1/26* (2013.01); *B60P 1/28* (2013.01)

(58) Field of Classification Search
CPC .... B60P 1/26; B60P 1/267; B60P 1/28; B60P 1/283; B62D 33/0273; B62D 33/037
See application file for complete search history.

(56) References Cited

U.S. PATENT DOCUMENTS

| | | | | |
|---|---|---|---|---|
| 3,958,829 A | * | 5/1976 | Brown | B60P 1/26 298/23 D |
| 4,068,892 A | * | 1/1978 | Welch | B62D 33/0273 298/23 D |
| 4,348,055 A | * | 9/1982 | Meisner | B60P 1/26 298/23 DF |
| 4,621,858 A | * | 11/1986 | Hagenbuch | B60P 1/26 298/23 DF |
| 4,678,235 A | * | 7/1987 | Hagenbuch | B60P 1/267 298/23 DF |
| 5,174,632 A | * | 12/1992 | Hagenbuch | B60P 1/267 296/183.2 |
| 5,249,843 A | * | 10/1993 | Hagenbuch | B60P 1/267 298/23 S |
| 5,474,363 A | * | 12/1995 | Hagenbuch | B60P 1/267 298/23 DF |
| 5,503,462 A | * | 4/1996 | Capps | B60P 1/267 298/23 D |
| 5,887,914 A | * | 3/1999 | Hagenbuch | B60P 1/267 296/183.2 |

(Continued)

FOREIGN PATENT DOCUMENTS

FR 492710 * 7/1919 ............... B60P 1/26

*Primary Examiner* — Gregory A Blankenship
(74) *Attorney, Agent, or Firm* — McDonnell Boehnen Hulbert & Berghoff LLP

(57) ABSTRACT

This present disclosure describes an automatically sealing tailgate mechanism for the transport of fluidic materials in vessels such as roll off containers and truck bodies. Currently, preventing material leakage from such vessels is ensured using manually operated locks, which put operating personnel of such vessels at risk. The automatic vessel locking system disclosed does not require manual operating intervention other than actions taken to perform a dumping operation.

20 Claims, 18 Drawing Sheets

(56) References Cited

U.S. PATENT DOCUMENTS

| | | | | |
|---|---|---|---|---|
| 6,595,569 B1* | 7/2003 | McKinney | ......... | B62D 33/0276 |
| | | | | 160/205 |
| 6,761,414 B1* | 7/2004 | Broberg | ............ | B62D 33/0273 |
| | | | | 296/56 |
| 8,491,031 B1* | 7/2013 | Brown | ...................... | B60P 1/26 |
| | | | | 49/475.1 |
| 10,974,896 B1* | 4/2021 | Vaselaar | .................... | B65F 3/20 |
| 2002/0067065 A1* | 6/2002 | McCafferty | ............... | B60P 1/26 |
| | | | | 298/23 R |
| 2002/0185890 A1* | 12/2002 | Hagenbuch | ............. | B60P 1/267 |
| | | | | 296/183.2 |
| 2003/0168885 A1* | 9/2003 | Hagenbuch | ............. | B60P 1/267 |
| | | | | 296/50 |
| 2003/0214174 A1* | 11/2003 | Hagenbuch | ............. | B60P 1/283 |
| | | | | 298/23 D |
| 2007/0063526 A1* | 3/2007 | Poudrier | ................. | B60R 13/06 |
| | | | | 296/39.3 |
| 2019/0016246 A1* | 1/2019 | Maiorana | .............. | B60P 3/2205 |
| 2020/0231078 A1* | 7/2020 | Bearinger | ................ | B60P 1/26 |
| 2020/0331377 A1* | 10/2020 | Tanudra | .................... | B60P 1/26 |
| 2021/0188146 A1* | 6/2021 | Lock | ........................ | B60P 1/283 |
| 2021/0188369 A1* | 6/2021 | Hagenbuch | ........ | B62D 33/0273 |
| 2022/0219588 A1* | 7/2022 | Lowerson | ............... | B60P 1/267 |

* cited by examiner

AUTOMATIC FLUIDIC SEALING TAILGATE

CROSS REFERENCE TO RELATED APPLICATIONS

This application claims priority to U.S. Provisional Application No. 62/949,924, filed Dec. 18, 2019, which is hereby incorporated by reference herein in its entirety.

FIELD

The present disclosure generally relates to vessels that are hauled by vehicles and, more particularly, relates to a tailgate for an open-top vessel that is hauled by a vehicle.

BACKGROUND

Haulage of fluidic materials often occurs for various reasons in open top vessels. These open top vessels are often four-sided boxes with one side being a vessel dumping opening. These vessels can either be fixed to the haulage vehicle such as a truck body vessel or can be semi-attached to the haulage vehicle such as waste haulage container vessels that are hauled by various means, such as rail, truck and similar means. The successful haulage of fluidic materials requires that the vessel dumping opening seals the fluidic material in during the loading and transport phases.

Today when material which may have fluids in it is transported in an open top vessel, the sealing shut of the vessel dumping opening during loading and transport is important. The vessel dumping opening is typically closed with a tailgate. For dumping, this tailgate is manually opened, and material is then emptied from the vessel.

Where absolute containment of fluidic material must be maintained, the typical way that the vessel tailgate is held shut is with manually operated chain binders rigidly holding the tailgate closed. These chain binders being manually operated means that operators most often are positioned at the rear of the vessel to release the vessel tailgate binders, which as the tailgate then opens exposes the vehicle operator who is releasing the binders to possible material contamination from the hauled material.

Without a positive vessel tailgate sealing system, during vessel transport there is a significant risk of material leakage from the vessel.

SUMMARY

Thus, the present disclosure provides a system and method for automatically sealing a tailgate against a vessel opening during a return from a dumping position, and for maintaining a tailgate seal against the vessel opening.

In a first aspect, the disclosure provides a system for automatically sealing a vehicle-mounted vessel, the system comprising:
- an open-top vessel configured to haul a load that includes liquid, the vessel including an end having an opening and a sealing surface around the opening;
- a tailgate plate operable to mate with the sealing surface so as to seal the opening closed; and
- an automatic tailgate operating mechanism configured to place the tailgate plate against the opening and move the tailgate plate toward the sealing surface when lowering the vessel from a dumping position.

In another aspect, the disclosure provides a system for automatically sealing a vehicle-mounted vessel, the system comprising:
- an open-top vessel configured to haul a load that includes liquid, the vessel including an end having an opening and a sealing surface around the opening;
- a tailgate plate operable to seal the opening of the vessel;
- a catch disposed on the vessel near the bottom of the opening and configured to receive a lower end of the tailgate plate; and
- an automatic tailgate operating mechanism configured to place the tailgate plate against the opening and move the tailgate plate toward the sealing surface when lowering the vessel from a dumping position, the automatic tailgate operating mechanism comprising a pair of arms, and links coupling the tailgate plate to the arms so as to raise and lower the tailgate plate while allowing movement of the tailgate plate with respect to the arms.

In another aspect, the disclosure provides a method of sealing a vehicle-mounted vessel, the method comprising:
- lowering an open-top vessel and an automatic tailgate operating mechanism from a dumping position to a hauling position such that a tailgate plate coupled to the automatic tailgate operating mechanism is placed against an opening of the open-top vessel and moved toward a sealing surface around the opening of the open-top vessel.

These and other aspects of the disclosure will be evident to those of ordinary skill in the art from the following detailed description.

BRIEF DESCRIPTION OF THE DRAWINGS

The present disclosure is described in greater detail below based on the exemplary figures. The figures are not necessarily to scale and certain features and certain views of the figures may be exaggerated in scale or depicted in schematic form for clarity or conciseness. The disclosure is not limited to the exemplary embodiments. All features described and/or illustrated herein can be used alone or combined in different combinations in embodiments of the disclosure. Features and advantages of various embodiments of the disclosure will become apparent by reading the following detailed description with reference to the figures which illustrate the following.

DETAILED DESCRIPTION

As set forth above, the present inventor has identified that there is a need for a tailgate system for a vessel that can hold liquids that does not require a manual operation by the user to form a seal around the vessel opening. Accordingly, aspects of the disclosure relate to a system and method for automatically sealing a tailgate against a vessel during a return from a dumping position, and for maintaining a seal against the vessel.

Accordingly, an aspect of the present disclosure provides a system for automatically sealing a vehicle-mounted vessel. The system includes an open-top vessel configured to haul a load that includes a liquid. The vessel includes an end having an opening and a sealing surface around the opening. A tailgate plate is operable to mate with the sealing surface so as to seal the opening closed. The system also includes an automatic tailgate operating mechanism configured to place the tailgate plate against the opening and move the tailgate plate toward the sealing surface when lowering the vessel from a dumping position.

Figure 1A:
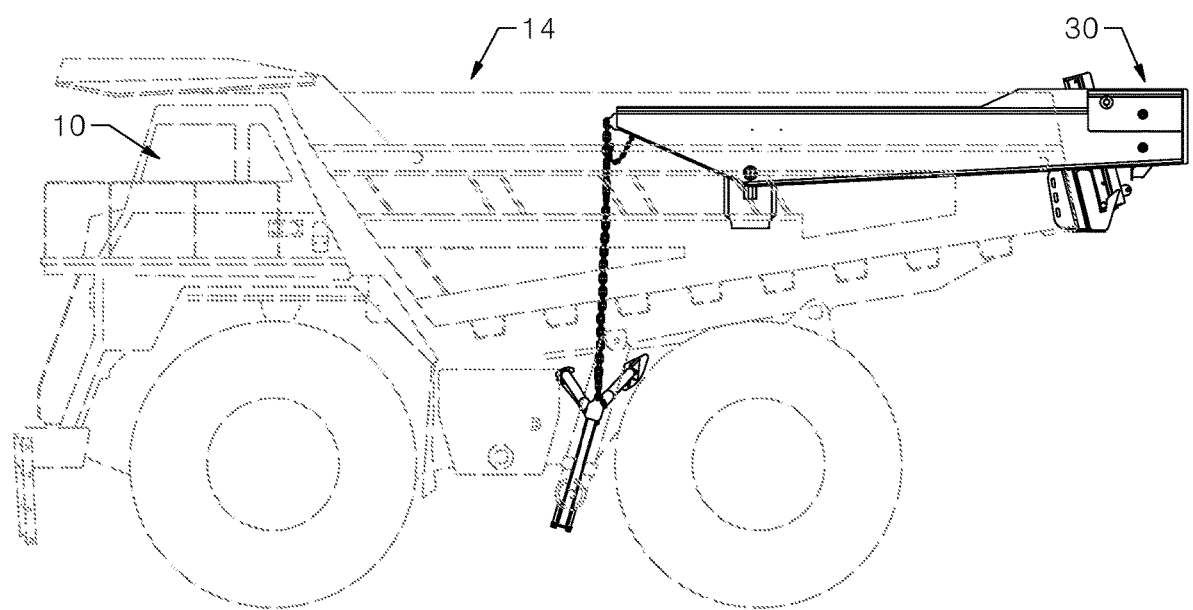
FIG. 1A is a schematic side view of a vehicle including system for automatically sealing a vessel according to an embodiment of the disclosure in a first position.
Figure 1B:
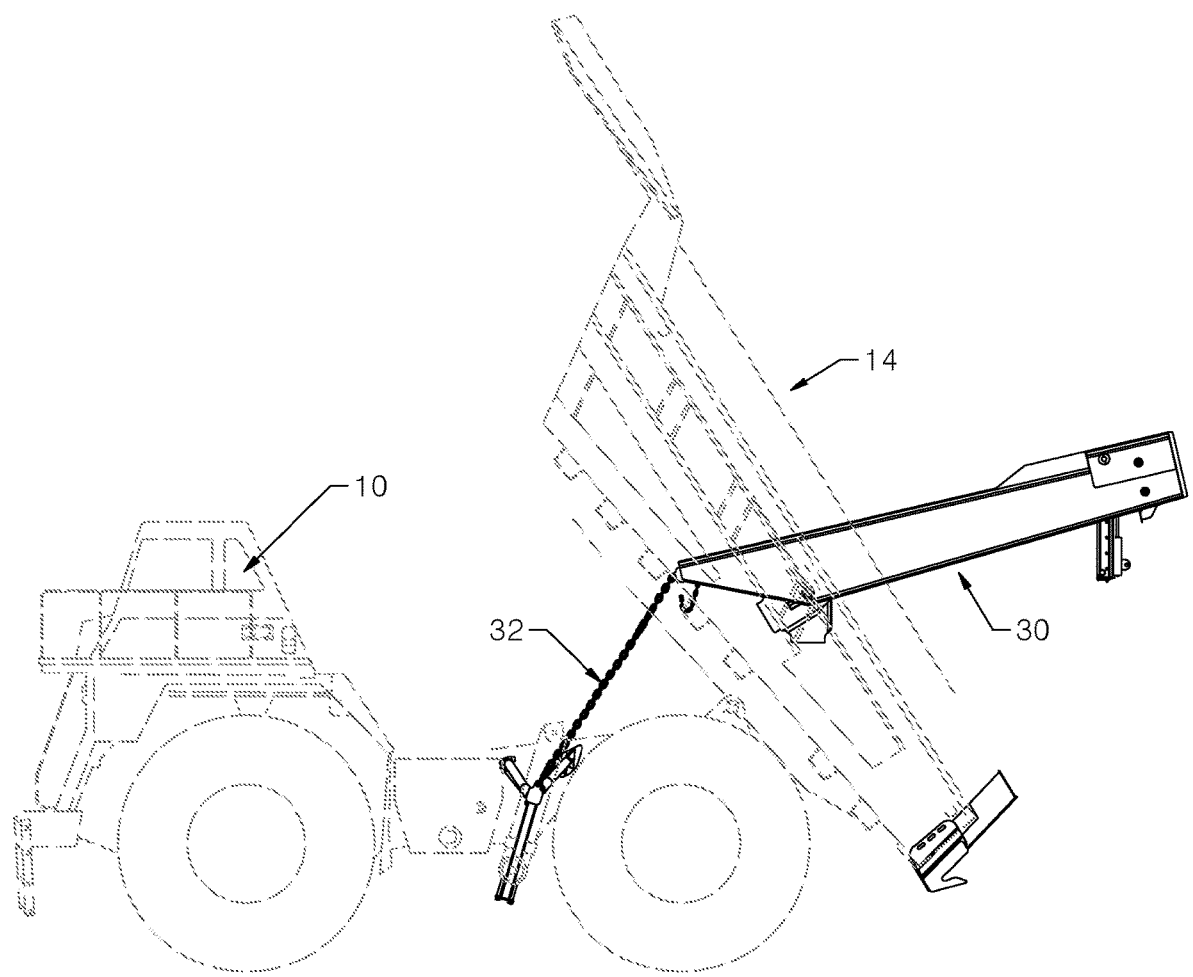
FIG. 1B is a schematic side view of the vehicle of FIG. 1A in a second position.

FIGS. 1A and 1B illustrate an embodiment of such a system included on a vehicle 10 for hauling a load. The vehicle 10 includes a vessel 14 that is configured to haul loads that include liquids. Specifically, the vessel is capable of substantially retaining liquids within the vessel during haulage without significant leaking. It should be understood that the description of the vessel as being configured to haul a load including a liquid is not limited to vessels specifically designed to carry liquids themselves, such as liquid tanks. Rather, the disclosure includes vessels that are configured to carry loads that might contain a liquid therein, such as a mixture of solids and liquids. The system also includes an automatic sealing tailgate 30 that is configured to seal an opening at an end of the vessel 14.

FIG. 1B shows the vessel 14 rotated up from the vehicle 10 in a dumping position. As the vessel 14 has rotated, an actuation link 32 that is anchored to the vehicle and to the automatic sealing tailgate 30 has caused a tailgate plate of the automatic sealing tailgate 30 to move away from the opening of the vessel 14, as described in more detail below, thereby allowing any load contained in the vessel 14 to fall from the vessel.

Figure 2A:
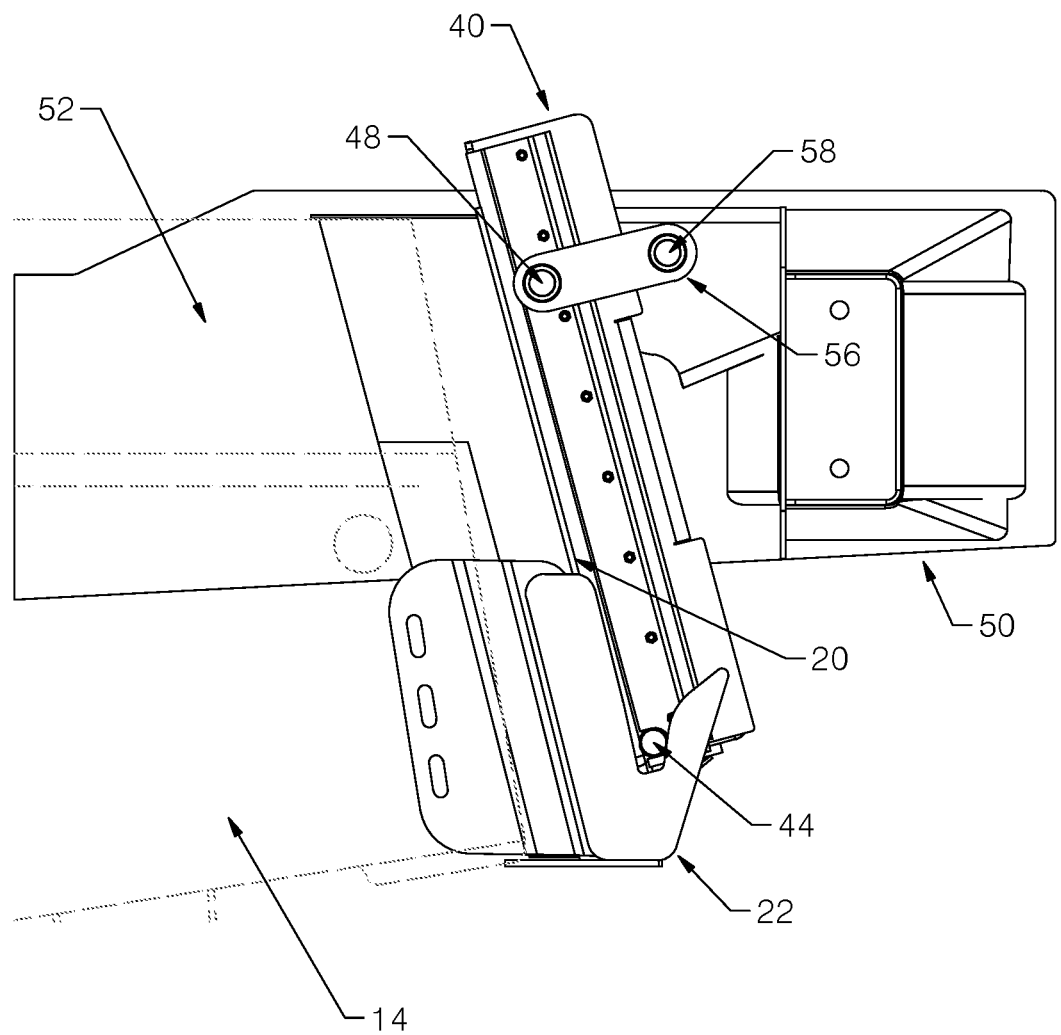
FIG. 2A is a schematic cross-sectional side view of a system for automatically sealing a vessel according to an embodiment of the disclosure in a first position.
Figure 2B:
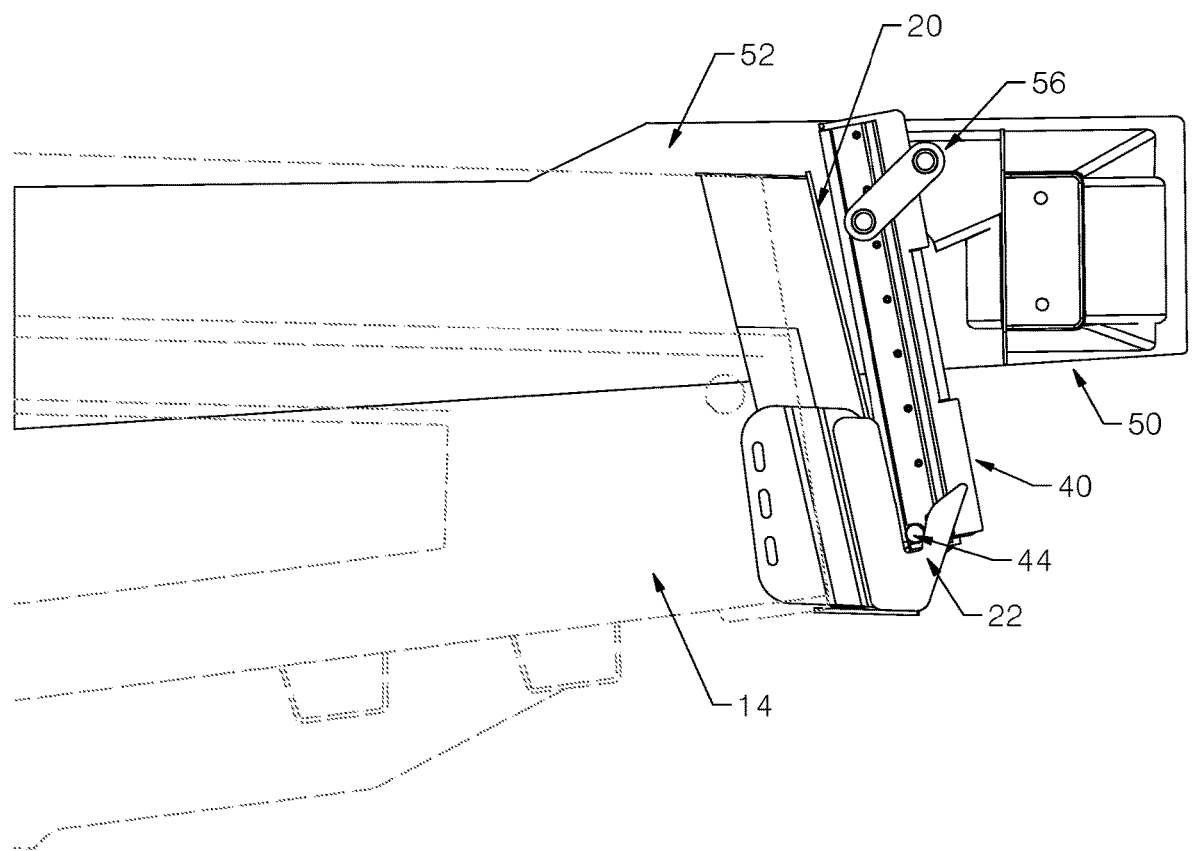
FIG. 2B is a schematic cross-sectional side view of the system of FIG. 2A in a second position.
Figure 2C:
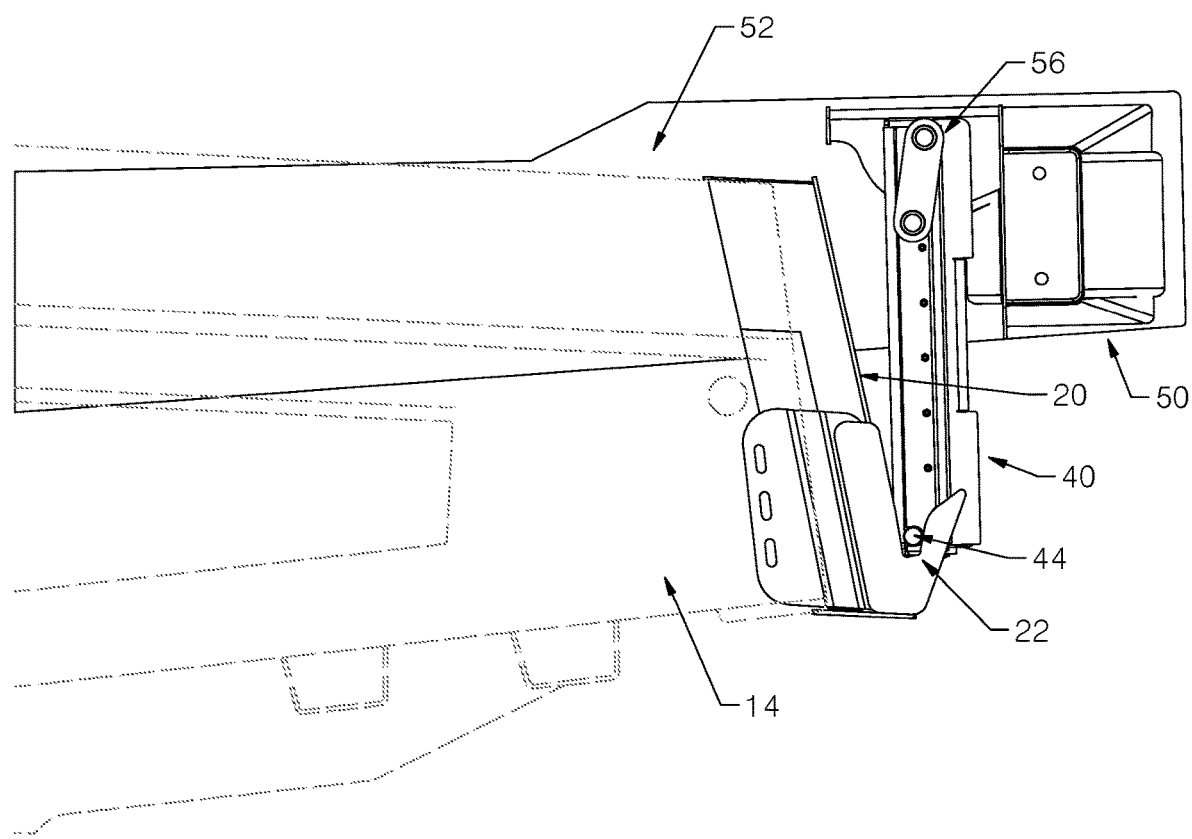
FIG. 2C is a schematic cross-sectional side view of the system of FIG. 2A in a third position.
Figure 2D:
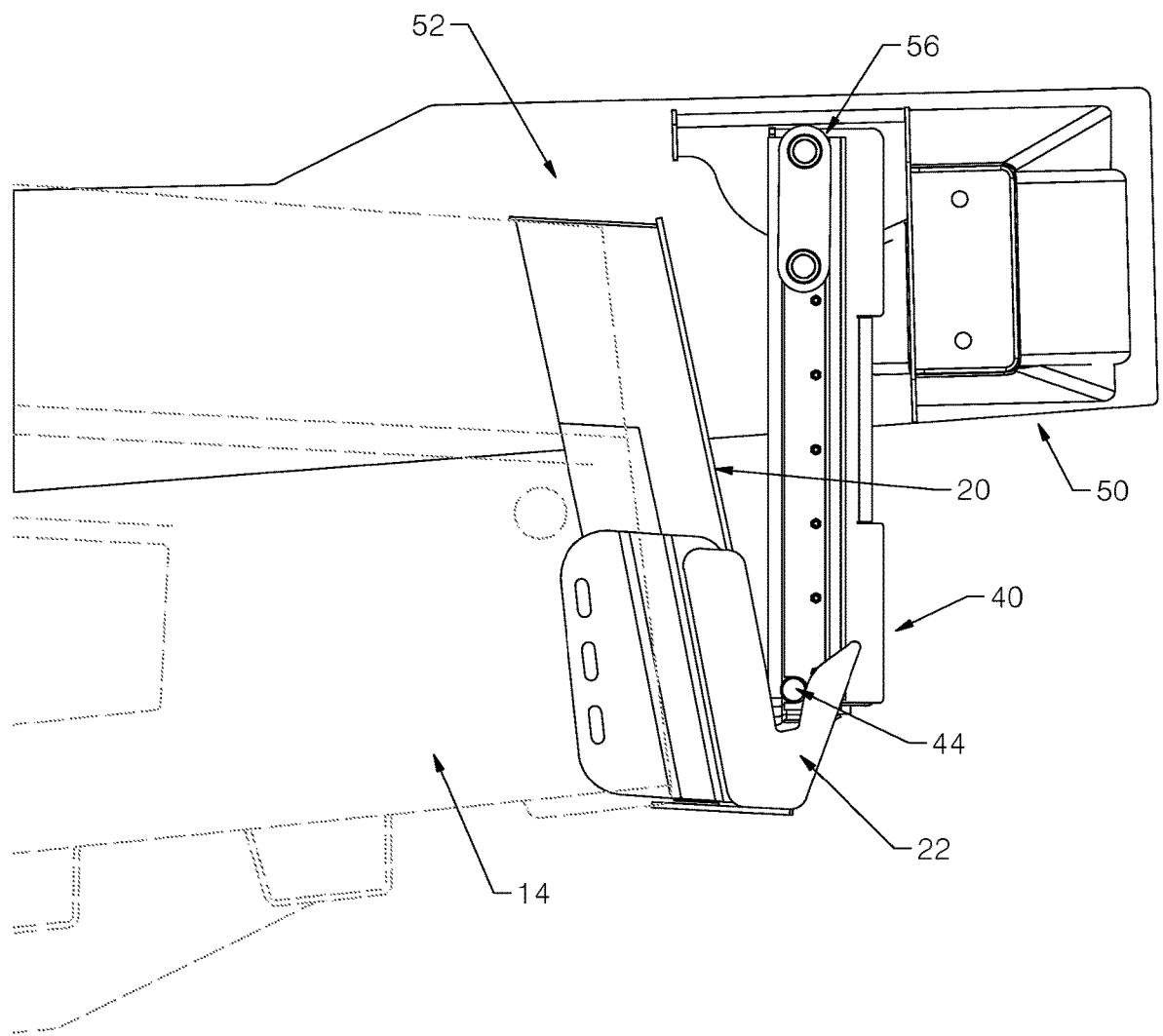
FIG. 2D is a schematic cross-sectional side view of the system of FIG. 2A in a fourth position.
Figure 2E:
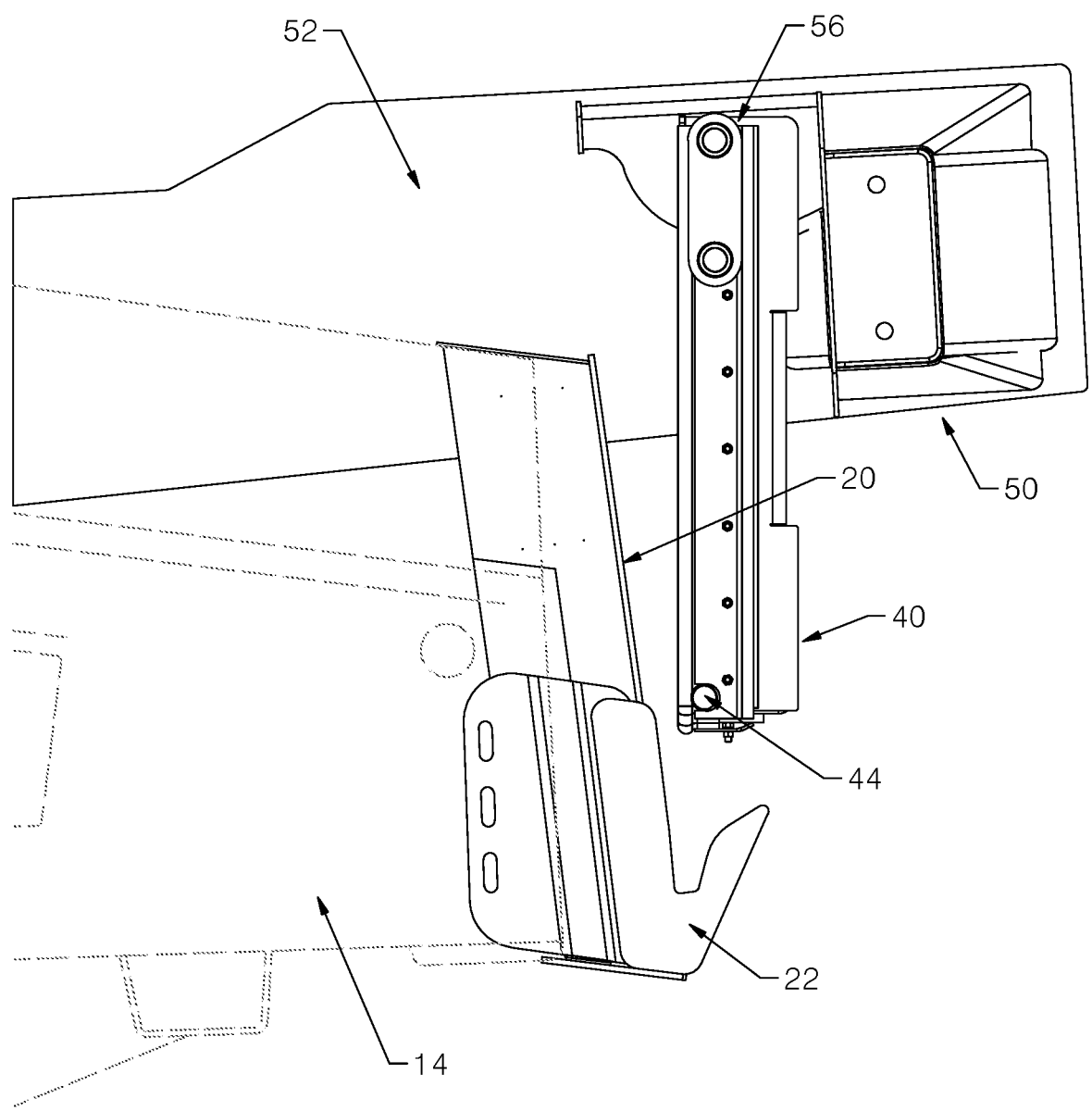
FIG. 2E is a schematic cross-sectional side view of the system of FIG. 2A in a fifth position.

FIGS. 2A-2E illustrate the movement of the tailgate plate 40 as the system moves from the hauling position toward a dumping position. In FIG. 2A, the tailgate operating mechanism 50 is in a lowered position and the tailgate plate 40 is in a fully closed position where it is sealed against a sealing surface 20 around the opening of vessel 14. FIGS. 2B and 2C illustrate that as the tailgate operating mechanism 50 begins to rise, the tailgate plate 40 is initially moved away from the sealing surface 20 of the vessel 14. In particular, the movement of the tailgate operating mechanism 50 initially rotates the tailgate plate 40 so that it recedes from sealing surface 20. As shown in FIGS. 2D and 2E, once the tailgate plate 40 is substantially vertical, further movement of both the vessel 14 and the tailgate operating mechanism 50 cause the tailgate plate 40 to be lifted away from the vessel 14 providing full access to the opening of the vessel.

As the vessel 14 is lowered in a lowering operation, the sequence shown in FIGS. 2A-2E is reversed. Initially, the tailgate plate 40 is lowered until it engages the vessel 14. Once the tailgate plate 40 is engaged with the vessel 14, it moves toward the sealing surface 20 so as to form a seal around the opening of the vessel 14.

Figure 3A:
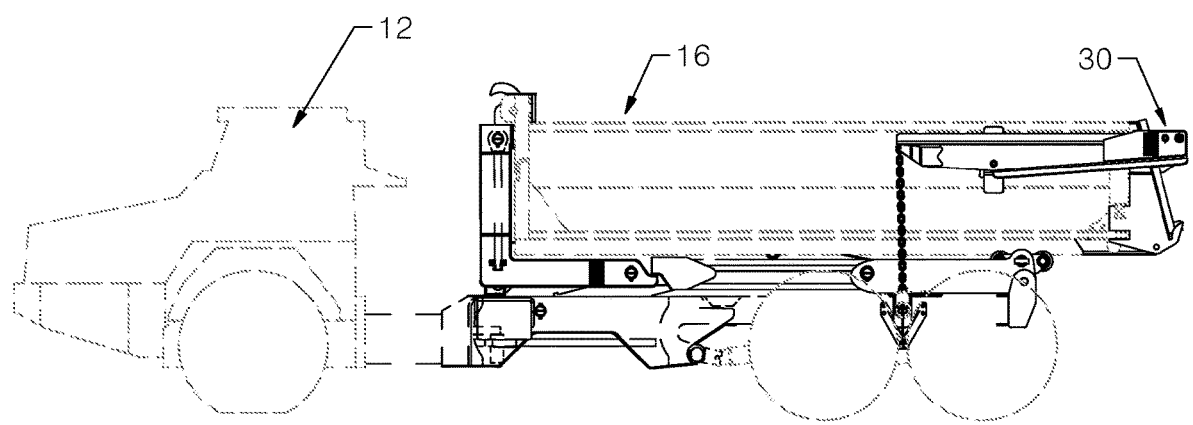
FIG. 3A is a schematic side view of a vehicle including system for automatically sealing a vessel according to another embodiment of the disclosure in a first position.
Figure 3B:
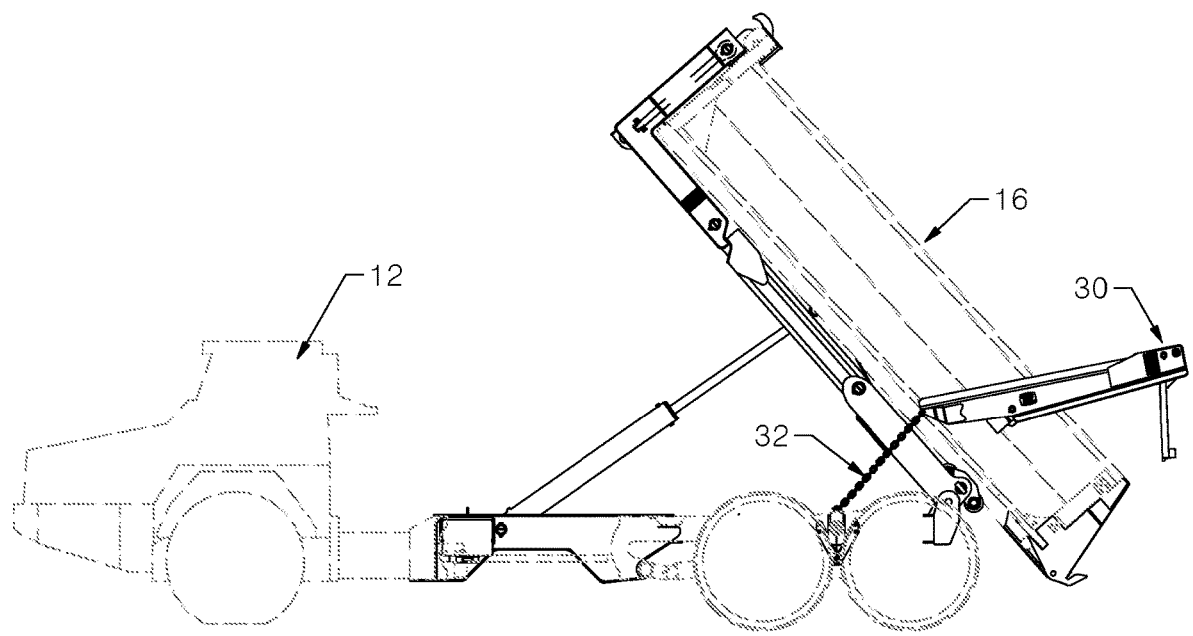
FIG. 3B is a schematic side view of the vehicle of FIG. 3A in a second position.

In some embodiments, the open-top vessel may be a truck body of a dump truck. For example, the vehicle 10 shown in FIGS. 1A and 1B is a dump truck, and vessel 14 is a truck body of the dump truck. In other embodiments, the vessel may have another configuration. For example, FIGS. 3A and 3B illustrate a container transport vehicle 12 that carries a container transport vehicle vessel 16. This system also includes an automatic sealing tailgate 30 that is configured to seal an opening at an end of the container transport vehicle vessel 16. FIG. 3B shows the container transport vehicle vessel 16 rotated up from the container transport vehicle 12 in a dumping position. As the vessel container transport vehicle vessel 16 is rotated upward, an actuation link 32 that is anchored to the container transport vehicle 12 and to the automatic sealing tailgate 30 causes a tailgate plate of the automatic sealing tailgate 30 to move away from the opening of the vessel 16, in a similar manner as described above with respect to FIGS. 2A-2E.

Figure 4:
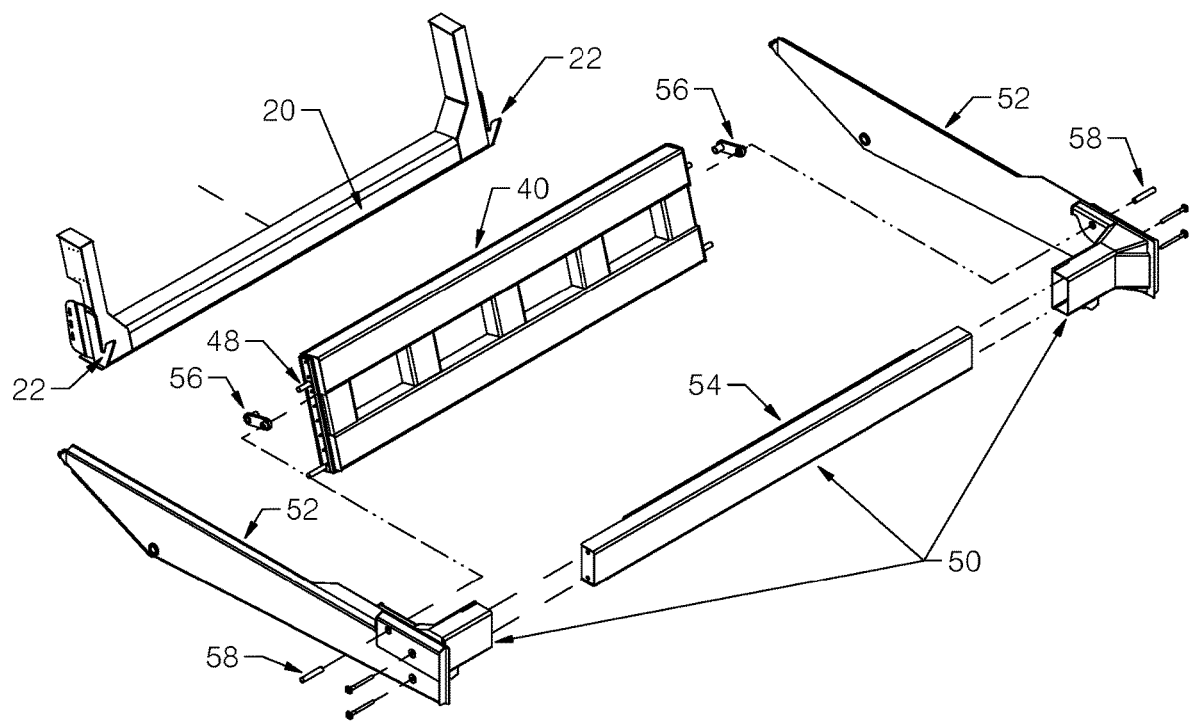
FIG. 4 is a schematic exploded rear perspective view of portions of a system for automatically sealing a vessel according to an embodiment of the disclosure.

In some embodiments, the automatic tailgate operating mechanism may include a pair of arms configured to raise and lower the tailgate plate. For example, FIG. 4 illustrates an embodiment of a portion of the system of the disclosure in an exploded view including the automatic tailgate operating mechanism 50, the tailgate plate 40, and the sealing surface 20 of the vessel 14. As illustrated, the automatic tailgate operating mechanism 50 may include a pair of arms 52 that are attached to opposing sides of the tailgate plate 40, as explained in more detail below. As the arms 52 of automatic tailgate operating mechanism 50 are raised and lowered, they carry the tailgate plate 40 so as to also raise and lower the tailgate plate 40. For example, one arm 52 of the automatic tailgate operating mechanism 50 is shown in FIGS. 2A-2E, wherein the tailgate plate 40 is raised from the sealing surface 20 of the vessel 14.

Figure 5:
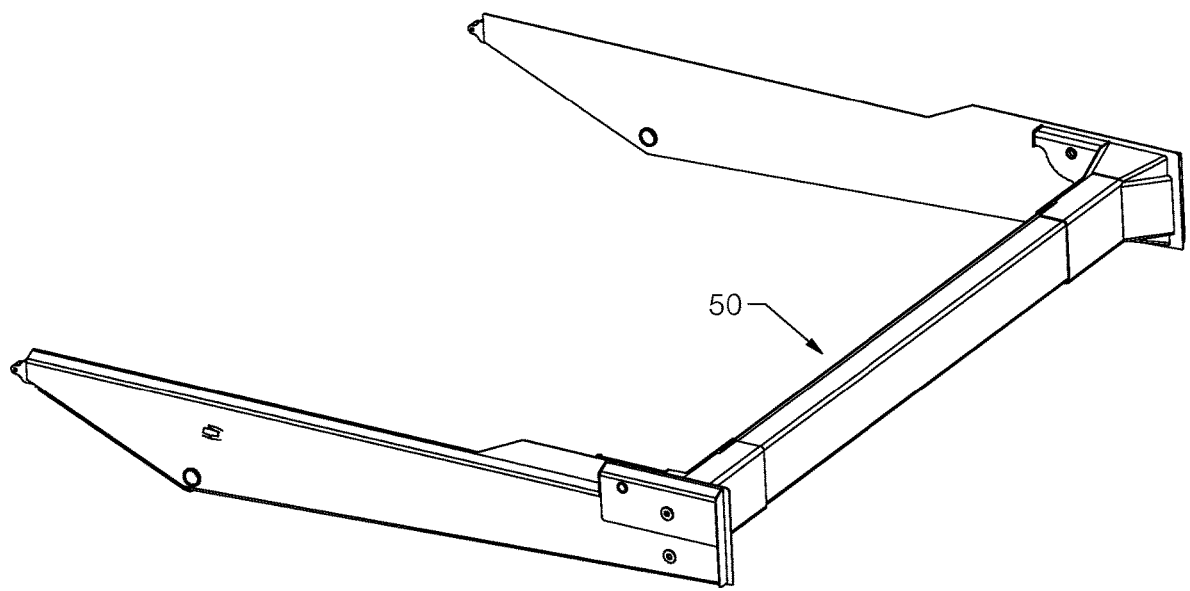
FIG. 5 is a schematic perspective view of a component of the system of FIG. 4 assembled.

In some embodiments, the automatic tailgate operating mechanism may include a connector extending from one arm to the other arm so as to form a U-shaped mechanism. For example, in the embodiment shown in FIG. 4, the automatic tailgate operating mechanism 50 includes a connector 54 that extends from one arm 52 to the opposing arm 52. When assembled, the arms 52 and connector 54 form the automatic tailgate operating mechanism 50 as a U-shaped mechanism, which is shown assembled in FIG. 5.

In some embodiments, the arms of the automatic tailgate operating mechanism may be coupled to the tailgate plate using links so as to allow movement of the tailgate plate with respect to the arms. For example, in the embodiment shown in FIG. 4, each of the arms 52 of automatic tailgate operating mechanism 50 is attached to a respective link 56 using a pin 58 (see also FIG. 2A). Accordingly, the link 56 is rotatable with respect to the associated arm 52 about the pin 58 that holds it in place. Each of the links 56 are further rotatably coupled to opposing sides of the tailgate plate 40 also using a pin 48 (see also FIG. 2A). This connection allows the tailgate plate 40 to be secured to the automatic tailgate operating mechanism 50, while still allowing some movement of the tailgate plate 40 with respect to the automatic tailgate operating mechanism 50 by the relative rotation of the links 56 with respect to either or both of the tailgate plate 40 and automatic tailgate operating mechanism 50.

The operation of the links 56 is depicted more clearly in FIGS. 2A-2E. As shown in FIG. 2A, when the tailgate plate 40 is closed and sealed against the sealing surface 20, link 56 is disposed at an angle to tailgate plate 40. As the automatic tailgate operating mechanism 50 is raised in a dumping operation, as shown in FIGS. 2B and 2C, the angle between the link 56 and tailgate plate 40 initially increases until the link 56 and tailgate plate 40 are both hanging substantially vertically. During this first phase of the dumping operation, as the angle between the link 56 and tailgate plate 40 is increased, the tailgate plate 40 is moved away from sealing surface 20. As the automatic tailgate operating mechanism 50 continues to raise in a second phase of the dumping operation, the link 56 and tailgate plate 40 hang from the automatic tailgate operating mechanism 50 and are moved away from the vessel 14.

When the system is lowered from the dumping position to a hauling position, the steps are carried out in reverse order. Initially, during a first phase of the lower operation, the link 56 and tailgate plate 40 hang until the tailgate plate 40 engages the vessel 14, as explained in more detail below. Once the tailgate plate 40 and the vessel 14 are engaged, the angle between the link 56 and the tailgate plate 40 is reduced during a second phase of the lower operation, and the tailgate plate 40 is moved toward the sealing surface 20 of the vessel 14.

In some embodiments, when the tailgate plate is closed against the sealing surface, the end of the link that is attached to the automatic tailgate operating mechanism is higher than the end that is attached to the tailgate plate. For example, as shown in FIG. 2A, when the tailgate plate 40 is in the closed position and flush against the sealing surface 20, a first end of the link 56 that is attached to automatic tailgate operating mechanism 50 is higher than the second end of the link 56 that is attached to the tailgate plate 40. As a result, when the tailgate plate 40 is in the closed position, a downward force on the first end of link 56 translates to pushing the tailgate plate 40 toward sealing surface 20 of vessel 14. Thus, the weight of the automatic tailgate operating mechanism 50 helps to retain the tailgate plate 40 in the closed position. This configuration of the link 56 that helps to push the tailgate plate 40 closed when the vessel 14 is in the hauling position is enabled by the length of the link 56 and the position of the connection of the link 56 with the automatic tailgate operating mechanism 50 relative to the vessel 14.

In some embodiments, the system may include a catch disposed on the vessel and configured to receive a lower end of the tailgate plate. For example, FIG. 4 shows a respective catch 22 positioned at the lower end of each side of the sealing surface 20 of the vessel. The operation of the catch 22 is shown in FIGS. 2A-2E. In the depicted embodiment, each side of the tailgate plate 40 includes a pin 44 and the vessel 14 has a catch 22 in the form of a hook positioned at the lower end of the vessel opening. As the tailgate plate 40 is lowered, the pin 44 is directed into the hook 22 until the tailgate plate 40 is supported by the bottom of the hook 22.

While the catch in the shown embodiments is formed as a hook, in other embodiments, the catch may have another configuration. For example, in some embodiments, the catch may be configured as a laterally projecting pin, while the tailgate plate includes a hook or other opening to receive the pin. Other configurations are also possible.

Figure 6A:
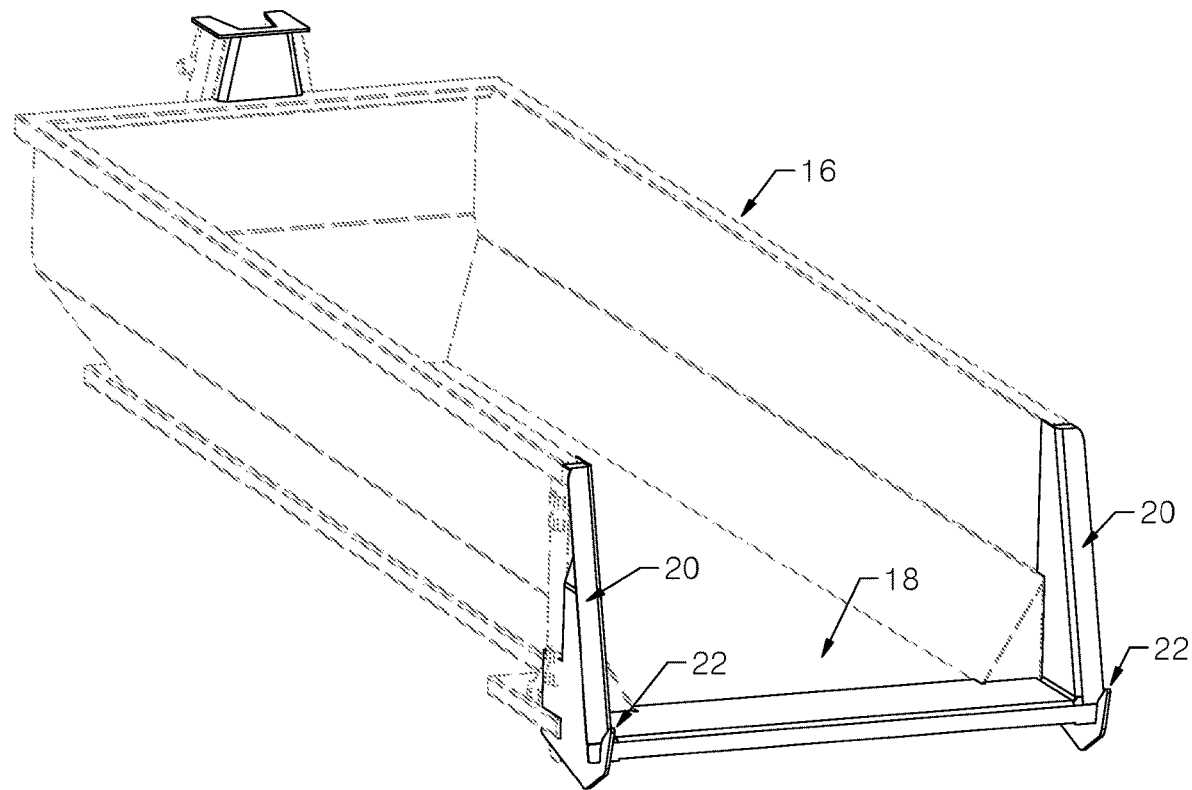
FIG. 6A is a schematic rear perspective view of a vessel for use with a system according to an embodiment of the disclosure.
Figure 6B:
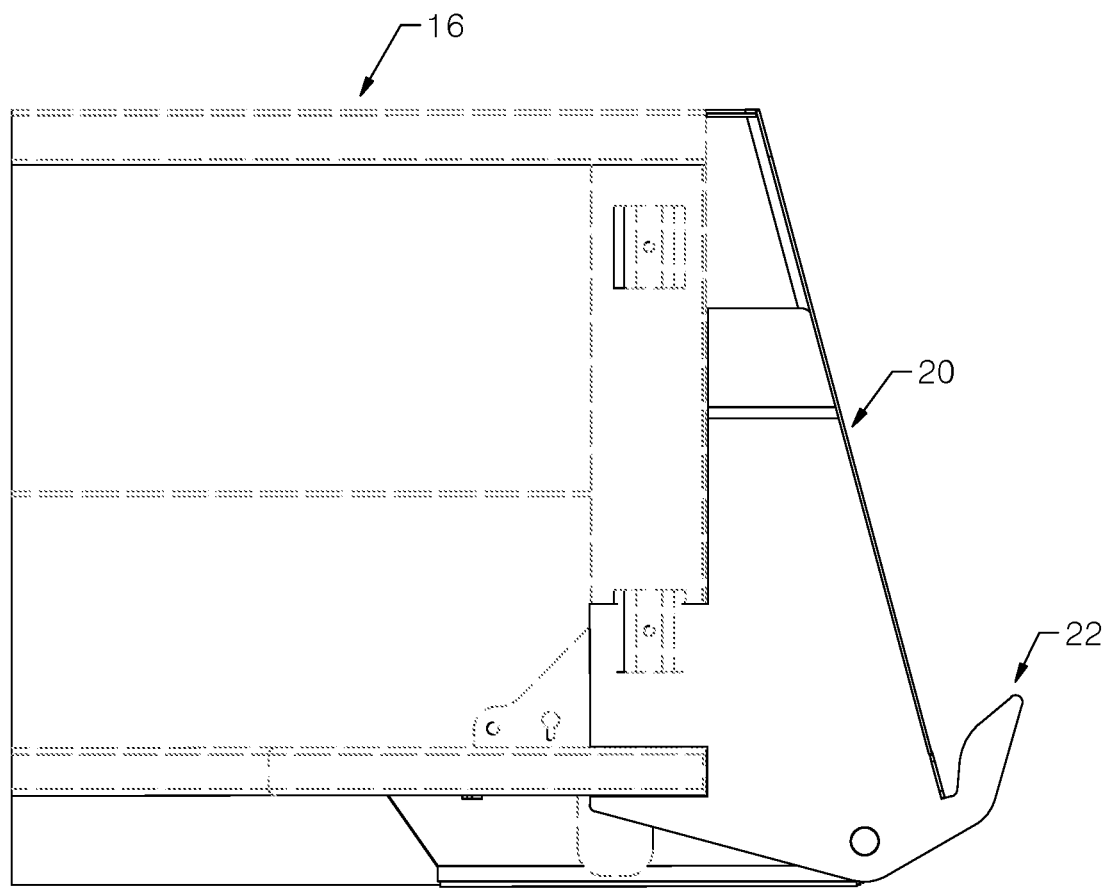
FIG. 6B is a schematic side view of a portion of the vessel of FIG. 6A.

FIGS. 6A and 6B depict an embodiment of the catch 22 included on a transport container vessel 16. As shown in FIG. 6A, the catch 22 is in the form of a hook and is positioned on either side of the opening 18 of the transport container vessel 16. Specifically, the catch 22 is positioned at the lower side of the open-end of the vessel 16 at the bottom of the sealing surface 20. Accordingly, after a tailgate plate (not shown) engages the catch 22, the tailgate plate will be urged against sealing surface 20. FIG. 6B shows a side view of the rear portion of the vessel 16.

Figure 7:
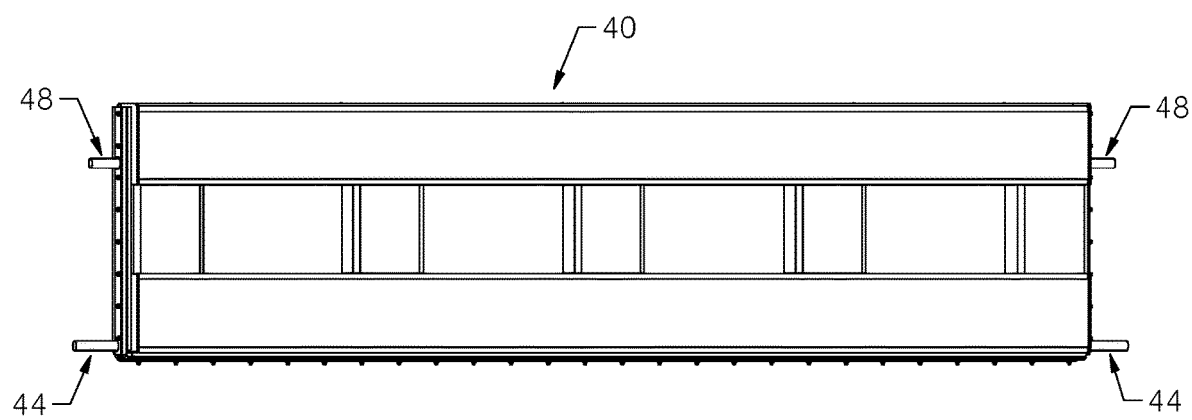
FIG. 7 is a schematic rear view of a tailgate plate for use with the vessel of FIG. 6A according to an embodiment of the disclosure.

FIG. 7 shows an embodiment of a tailgate plate 40 configured for operation with the transport container vessel 16 shown in FIGS. 6A and 6B. The tailgate plate 40 shown in FIG. 7 includes lateral pins 48 for coupling to the automatic tailgate operating mechanism via links, as described above, and also lateral pins 44 for engaging the catches 22 on the vessel 16.

Figure 8A:
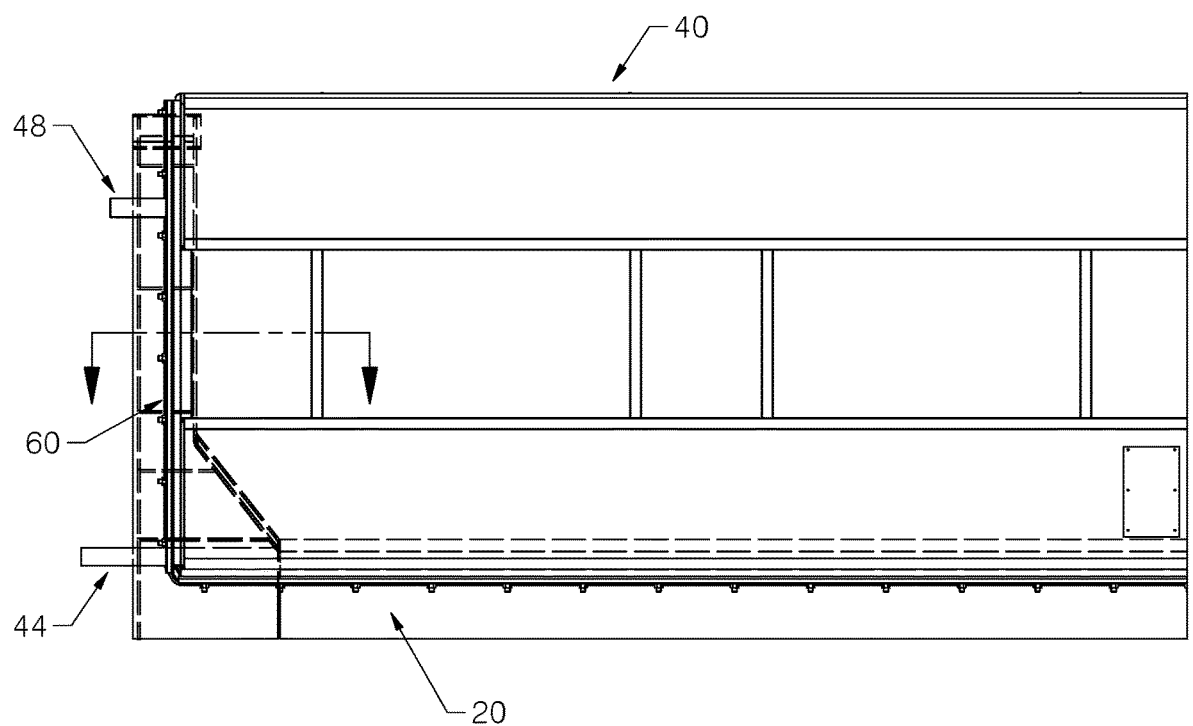
FIG. 8A is a schematic rear view of a portion of a tailgate plate against a sealing surface of a vessel according to an embodiment of the disclosure.
Figure 8B:
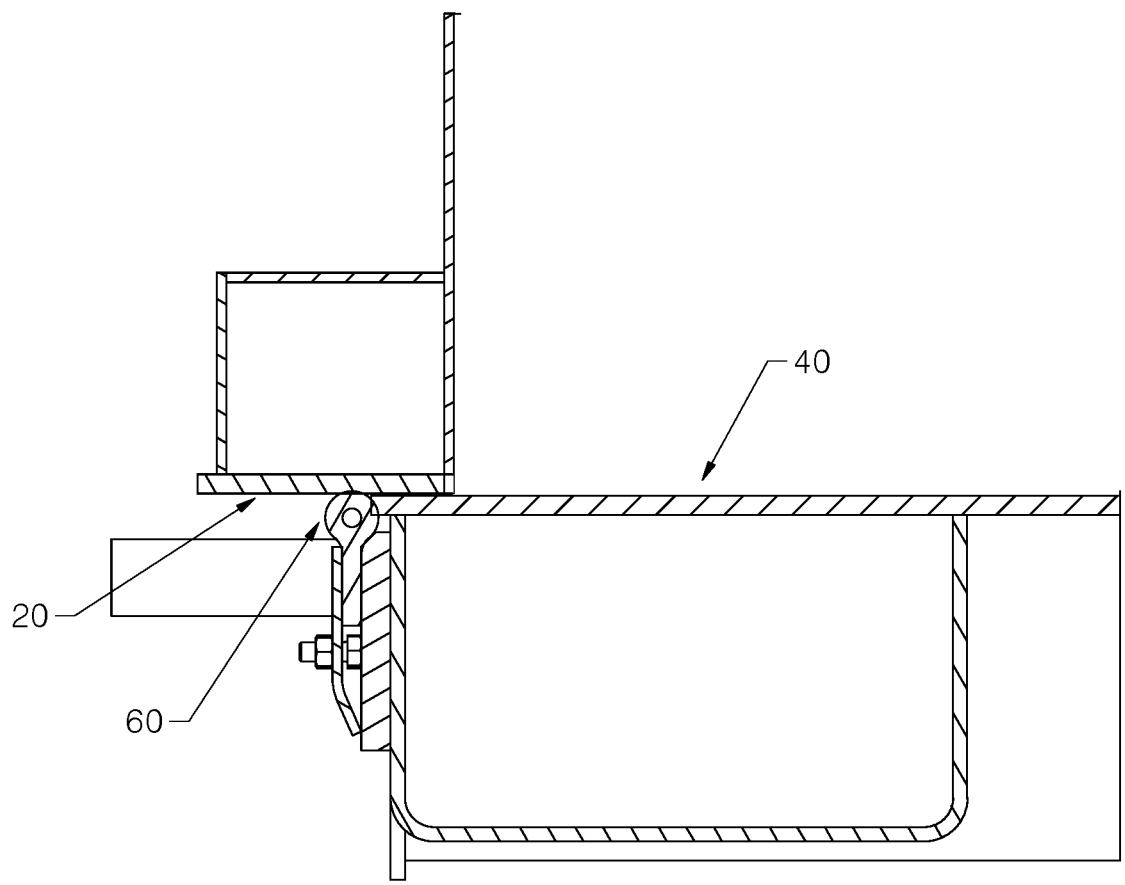
FIG. 8B is a schematic cross-sectional top view of a portion of the tailgate plate of FIG. 8A.

In some embodiments, the tailgate plate may include a seal configured to engage the sealing surface of the vessel. For example, FIGS. 8A and 8B show the tailgate plate 40 disposed against the sealing surface 20. As illustrated, a seal 60 may be disposed along the side of the tailgate plate 40 that includes the pins 44, 48. As shown in FIG. 8B, the seal 60 may be configured to press against the sealing surface 20 of the vessel to form a seal for retaining liquids in the vessel. The seal 60 may also extend across the bottom of the tailgate plate 40 as well as along the other side of the tailgate plate 40. The seal may be an elastomeric seal. Other configurations are also possible, such as a flexible metal seal.

Figure 9A:
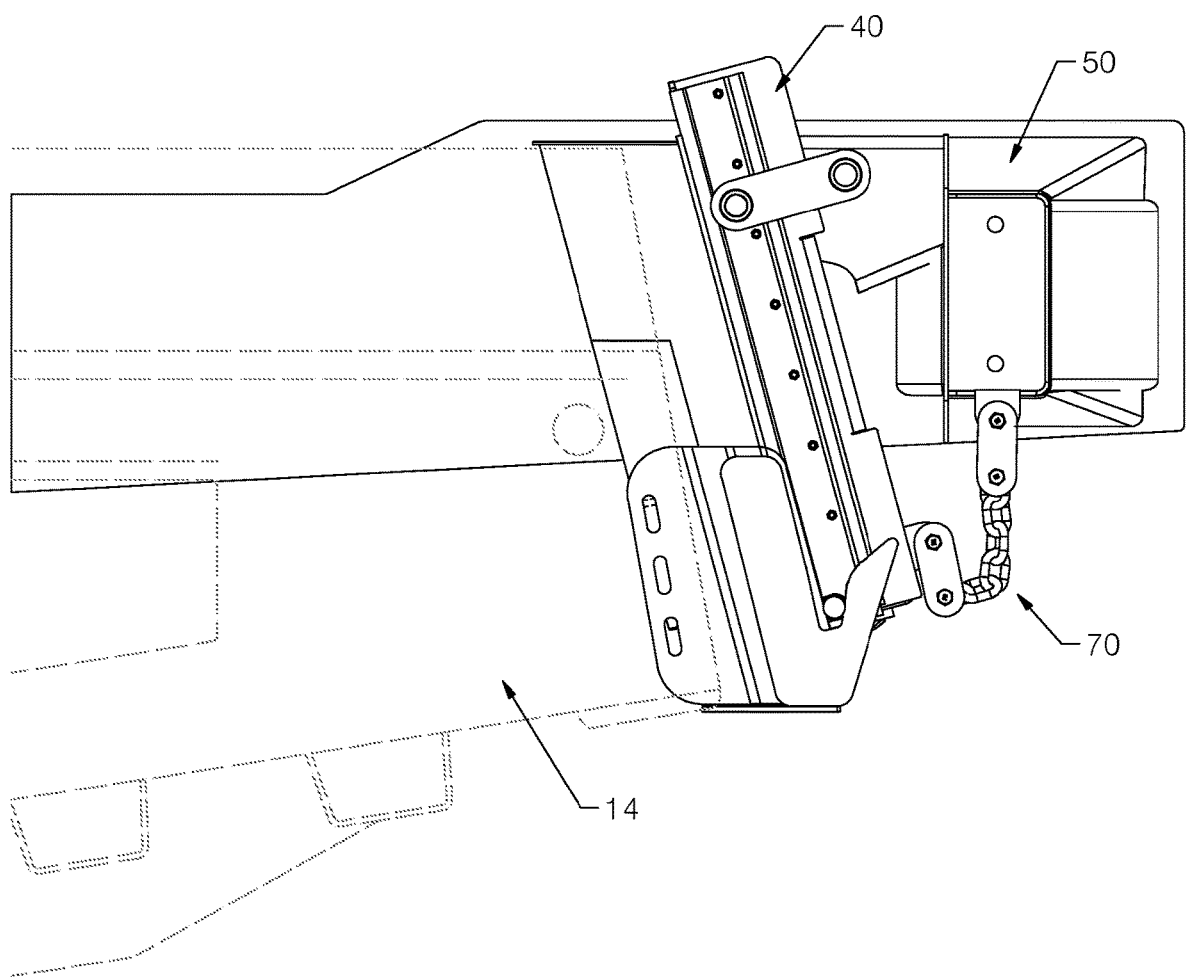
FIG. 9A is a schematic side view of a portion of a system for automatically sealing a vessel according to another embodiment of the disclosure in a first position.
Figure 9B:
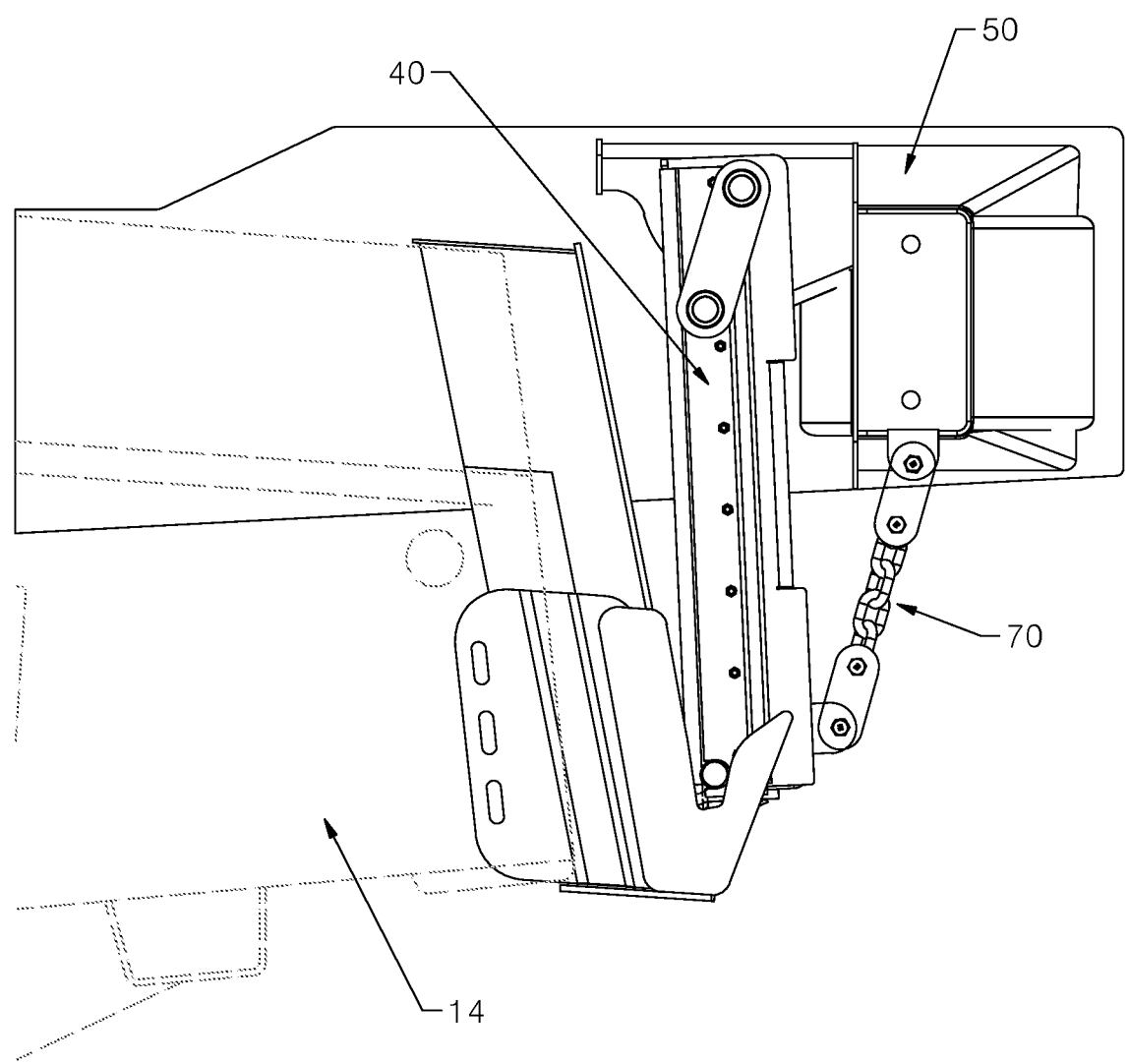
FIG. 9B is a schematic side view of a portion of the system of FIG. 9A in a second position.

In some embodiments, the automatic tailgate operating mechanism may include a restraint configured to restrict movement of a lower end of the tailgate plate. An embodiment including such a restraint is shown in FIGS. 9A and 9B. The system shown in FIGS. 9A and 9B includes a restraint 70 that extends from the automatic tailgate operating mechanism 50 to a lower end of the tailgate plate 40. When the automatic tailgate operating mechanism 50 is raised with respect to the vessel 14, the restraint 70 may prevent the tailgate plate 40 from swinging forward. Accordingly, the restraint 70 can help prevent the tailgate plate 40 from swinging too far forward into the opening of the vessel. In the depicted embodiment, the restraint 70 is configured as a chain that extends from the lower end of the tailgate plate 40 to the automatic tailgate operating mechanism 50. When the automatic tailgate operating mechanism 50 is raised, the restraint can be taut or close to taut to prevent forward swinging of the tailgate plate 40. On the other hand, when the automatic tailgate operating mechanism is lowered, as shown in FIG. 9A, the restraint becomes relaxed and does not hinder the movement of the tailgate plate 40. In other embodiments, the restraint may have another configuration. For example, in some embodiments, the restraint may be formed as an obstruction positioned on the automatic tailgate operating mechanism that prevents the lower end of the tailgate plate from swinging forward. Other configurations are also possible.

As used herein, the description of a system, apparatus, device, structure, article, element, component, or hardware as being "configured to" perform a specified function is indeed capable of performing the specified function without any alteration, rather than merely having potential to perform the specified function after further modification. In other words, the system, apparatus, structure, article, element, component, or hardware "configured to" perform the specified function is specifically selected, created, implemented, utilized, programmed, and/or designed for the purpose of performing the specified function. Further, as used herein, the term "configured to" denotes existing characteristics of the system, apparatus, structure, article, element, component, or hardware which enable the system, apparatus, structure, article, element, component, or hardware to perform the specified function without further modification.

While various aspects and embodiments have been disclosed herein, it will be apparent to those skilled in the art that various modifications and variations may be made to the devices and methods described here without departing from the scope of the disclosure. Accordingly, the present disclosure is intended to cover such modifications and variations of the disclosure, with the scope of the disclosure being set forth by the appended claims and their equivalents.

The invention claimed is:

1. A system for automatically sealing a vehicle-mounted vessel, the system comprising:
    an open-top vessel configured to haul a load that includes liquid, the vessel including an end having an opening and a sealing surface around the opening;
    a tailgate plate operable to mate with the sealing surface so as to seal the opening closed; and
    an automatic tailgate operating mechanism including a pair of arms configured to raise and lower the tailgate plate, wherein the tailgate plate is movable relative to the arms, such that the automatic tailgate operating mechanism is configured to place the tailgate plate against the opening and then move the tailgate plate toward the sealing surface when lowering the vessel from a dumping position.

2. The system according to claim 1, wherein the open-top vessel is a truck body of a dump truck.

3. The system according to claim 1, wherein the open-top vessel is a container that is removable from a vehicle.

4. The system according to claim 1, wherein the pair of arms are configured to raise and lower the tailgate plate.

5. The system according to claim 4, wherein the automatic tailgate operating mechanism includes a connector extending from one arm to the other arm so as to form a U-shaped mechanism.

6. The system according to claim 4, wherein each arm is coupled to a respective side of the tailgate plate.

7. The system according to claim 6, wherein the arms are coupled to the tailgate plate using links so as to allow movement of the tailgate plate with respect to the arms.

8. The system according to claim 7, wherein each link is coupled at a first end to the respective arm and at a second end to the tailgate plate, and wherein, when the tailgate plate is closed against the sealing surface, the first end of each link is higher than the second end.

9. The system according to claim 1, further comprising a catch disposed on the vessel and configured to receive a lower end of the tailgate plate.

10. The system according to claim 9, wherein the catch is formed as a hook and the tailgate plate includes a laterally extending pin configured to be received in the hook.

11. The system according to claim 1, wherein the tailgate plate includes a seal configured to engage the sealing surface of the vessel.

12. The system according to claim 1, wherein the automatic tailgate operating mechanism includes a restraint configured to restrict movement of a lower end of the tailgate plate.

13. A system for automatically sealing a vehicle-mounted vessel, the system comprising:
    an open-top vessel configured to haul a load that includes liquid, the vessel including an end having an opening and a sealing surface around the opening;
    a tailgate plate operable to seal the opening of the vessel;
    a catch disposed on the vessel near the bottom of the opening and configured to receive a lower end of the tailgate plate; and
    an automatic tailgate operating mechanism configured to place the tailgate plate against the opening and move the tailgate plate toward the sealing surface when lowering the vessel from a dumping position, the automatic tailgate operating mechanism comprising a pair of arms, and links coupling the tailgate plate to the arms so as to raise and lower the tailgate plate while allowing movement of the tailgate plate with respect to the arms.

14. The system according to claim 13, wherein the automatic tailgate operating mechanism includes a connector extending from one arm to the other arm so as to form a U-shaped mechanism.

15. The system according to claim 13, wherein the catch is formed as a hook and the tailgate plate includes a laterally extending pin configured to be received in the hook.

16. A method of sealing a vehicle-mounted vessel, the method comprising:
    lowering an open-top vessel and an automatic tailgate operating mechanism from a dumping position to a hauling position, wherein a tailgate plate is coupled to the automatic tailgate operating mechanism such that continued lowering of the automatic tailgate operating mechanism causes the tailgate plate to be lowered in a first direction, placed against an opening of the open-top vessel, and then urged in a second direction toward a sealing surface around the opening of the open-top vessel.

17. The method according to claim 16, wherein the lowering of the open-top vessel and automatic tailgate operating mechanism includes a first phase in which the tailgate plate hangs until the tailgate plate engages a catch on the open-top vessel.

18. The method according to claim 17, wherein the lowering of the open-top vessel and automatic tailgate operating mechanism includes a second phase in which the tailgate plate is engaged with the catch and the tailgate plate moves toward the sealing surface around the opening of the open-top vessel.

19. The method according to claim 17, wherein a restraint restricts the motion of the tailgate plate during the first phase of the lowering of the open-top vessel and automatic tailgate operating mechanism.

20. The method according to claim 16, further comprising pushing the tailgate plate against the sealing surface around the opening of the open-top vessel by the weight of the automatic tailgate operating mechanism so as to maintain a seal between the vessel and the tailgate plate.

* * * * *